United States Patent [19]

Suyama

[11] 4,023,178
[45] May 10, 1977

[54] RADIO-CONTROLLED VEHICLE WITH RF NOISE ELIMINATION FEATURE AND WITH ULTRASONIC ANTI-COLLISION MEANS INSENSITIVE TO MECHANICAL SHOCKS

[75] Inventor: Hisao Suyama, Gunma, Japan

[73] Assignees: Sanyo Electric Co., Ltd., Moriguchi; Tokyo Sanyo Electric Co., Ltd., Gunma, both of Japan

[22] Filed: July 23, 1975

[21] Appl. No.: 598,469

[30] Foreign Application Priority Data

July 24, 1974 Japan .............................. 49-85470
July 26, 1974 Japan .............................. 49-86920

[52] U.S. Cl. ................................ 343/225; 340/385
[51] Int. Cl.² .......................................... H04B 7/00
[58] Field of Search ............ 343/225; 340/33, 38 S

[56] References Cited

UNITED STATES PATENTS

| | | | |
|---|---|---|---|
| 3,448,822 | 6/1969 | LaLone et al. | 340/33 |
| 3,742,507 | 6/1973 | Pirre | 343/225 |
| 3,835,950 | 9/1974 | Asano et al. | 340/33 |
| 3,860,906 | 1/1975 | Browning | 343/225 |
| 3,892,483 | 7/1975 | Säufferer | 340/33 |

*Primary Examiner*—Marshall M. Curtis
*Attorney, Agent, or Firm*—Sughrue, Rothwell, Mion, Zinn & Macpeak

[57] ABSTRACT

A radio-controlled vehicle having a steering motor, a drive motor, a drive mechanism, and a direction sensor for receiving an RF signal from a remote station to actuate the drive motor and to control the steering motor to direct the vehicle to the station. Also, an ultra-sonic anti-collision circuit for preventing the vehicle from colliding with any obstacle lying in the way of its travel. The direction sensor includes an integrating circuit to remove noise components from the direction control signal to thereby provide precise control to the drive mechanism. The ultra-sonic anti-collision circuit includes circuits for preventing malfunction of the anti-collision circuit due to mechanical shocks and/or vibrations of the vehicle.

3 Claims, 7 Drawing Figures

4,023,178

RADIO-CONTROLLED VEHICLE WITH RF NOISE ELIMINATION FEATURE AND WITH ULTRASONIC ANTI-COLLISION MEANS INSENSITIVE TO MECHANICAL SHOCKS

FIELD OF THE INVENTION

The present invention relates to a self-transporting vehicle such as golf cart which can pursue a player in response to an RF signal from a player carrying transmitter.

BACKGROUND OF THE INVENTION

The steering of autotracing compact carrying vehicle such as golf cart is generally performed in either of the two methods. That is, in the first method, an RF signal transmitted from a transmitter carried by a player is received by two antennae carried on the cart and the steering is made by utilizing a difference in sensitivity between the two antennae. The other method utilizes a non-directional antenna and a directional antenna such as a loop antenna to utilize a difference in phase between the antennae. For the golf cart, the second method has been used widely because the electric field strength in the golf course area can not be uniform.

In the conventional system, the RF signal received by the loop antenna is fed to a 90° phase shifter and the shifted signal is fed to a balanced modulator in which it is modulated by a rectangular wave. The modulated signal is mixed with the signal received by the non-directional antenna to obtain an IF signal which is detected by a detection circuit to obtain a pulse in phase or out of phase by 180° by which the steering mechanism of the cart is controlled.

This method, however, is not effective if the electric field strength due to the RF signal is relatively weak and S/N ratio is low.

The conventional golf cart further includes an anti-collision device, which is in general, an ultra-sonic device, to prevent the cart from colliding with any obstacles. In this device, a sending transducer transmits an ultra-sonic wave and a receiving transducer receives an echo from an obstacle which is then detected to deenergize a drive motor.

This device, however, has a disadvantage that the receiving transducer often picks-up mechanical shocks and/or vibrations exerted on the cart body and provides pulse-like noises by which the load means such as drive motor which is to be deenergized by the output of the receiving transducer malfunctions.

In order to eliminate the above disadvantage, it is usual to provide a cushion material on the cart to thereby block the transmission of the shocks to the transducer. This procedure is not only complicated work but also not so effective.

An object of the present invention is to provide an improved autotracing carrying vehicle.

Another object to the present invention is to provide an improved direction sensor to be mounted on the vehicle.

Another object of the present invention is to provide an improved ultra-sonic anti-collision circuit to be mounted on the same vehicle.

Other objects and features of the present invention will become apparent by reading the description of the preferred embodiments of the present invention with reference to the attached drawings which are as follows.

DESCRIPTION OF PREFERRED EMBODIMENTS

Figure 1:
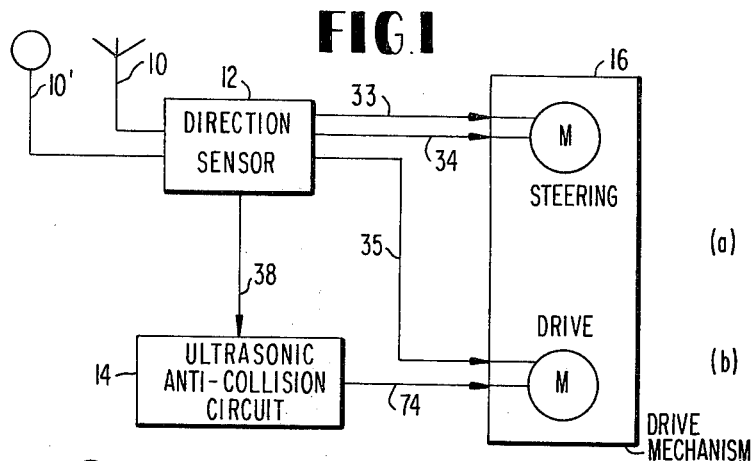
FIG. 1 is schematic block diagram of an electric system of the present vehicle which is to be mounted on the vehicle body.

Returning now to FIG. 1, it shows a block diagram of a self-transporting carrying vehicle in which the present invention is embodied. In FIG. 1, a non-directional antenna 10 receives a radio frequency signal transmitted by a transmitter carried by an operator of the vehicle which is in a remote position from the vehicle, and a directional antenna 10' also receives the RF signal. The antennae 10 and 10' are connected to a direction sensor 12 in which a phase difference between signals from the respective antennae is detected as in the conventional system.

Figure 2:
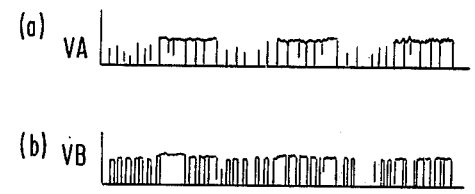
FIG. 2 is a block diagram of a conventional direction sensor.
Figure 2:
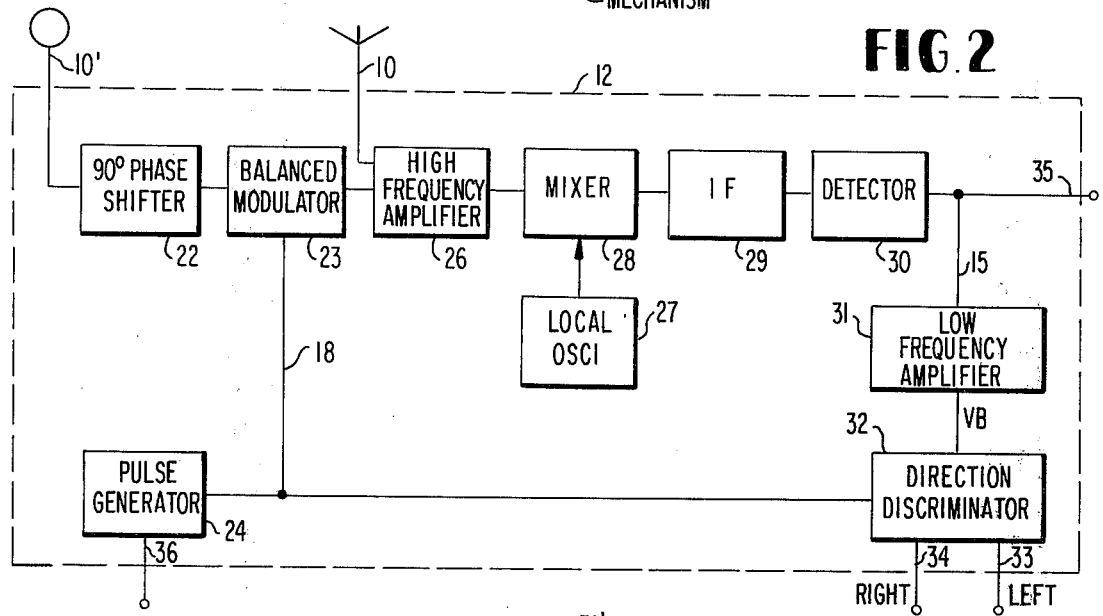

FIG. 2 is a more detailed block diagram of the direction sensor 12 in FIG. 1. The signal from the directional antenna 10' such as, for example, loop antenna is fed to a balanced modulator 23 via a 90° phase shifter 22 to regulate the phase with respect to that of the signal from the antenna 10. To the balanced modulator 23, a rectangular wave signal whose frequency is several ten hertz is also supplied from a pulse generator 24 as a modulation signal. A modulated output signal from the modulator 23 is combined with the signal from the non-directional antenna 10. The combined signal is amplified by a high frequency amplifier 26 and then converted into an intermediate frequency by means of a local oscillator 27 and a mixer 28. The IF signal is passed through an intermediate frequency amplifier stage 29 and detected by a detection circuit 30. The detection circuit 30 provides output pulses in a phase or out of phase by 180° with respect to the reference signal pulse which is the output of the pulse generator 24, depending on the direction of the RF incoming signal.

The output signal of the detection circuit 30 is amplified by a low frequency amplifier circuit 31 and, in some case, shaped, if desired, by a Schmidt trigger circuit. The amplified signal from the amplifier circuit 31 is discriminated by a discriminator 32 to determine whether it is due to an RF signal from the right or left side, and the discriminator 32 provides an output at a terminal 33 when the RF signal is from left side and at a terminal 34 when the RF signal is from right side.

The output at the terminals 33 or 34 is applied to a relay control circuit (not shown) so that the vehicle will be directed automatically to the side from which the RF signal incomes and advanced in the direction upon a control of a steering device which is controlled by the relay control circuit.

Figure 3:
FIG. 3 shows signal waveforms at two points in the sensor shown in FIG. 2.

The above described conventional control system, however, has an important disadvantage. That is, where an electrical field strength due to the RF signal is relatively weak and and S/N ratio is relatively low, it is very difficult to determine the direction of the incoming signal as shown by a detection output (a) and output signal (b) of the low frequency amplifier circuit 31 in FIG. 3, and, in such case, this system may not be practical. In order to overcome this problem, it has been proposed to increase the amplification of the low frequency amplifiier circuit 31. However, since, when the amplification of the amplifier is increased too much, the S/N ratio will be degraded because of the corresponding amplification of noise, there is a practical limit of increase of the amplification.

Alternatively, it can also be considered to increase the output power of the transmitter to increase the field strength. However, the output power can not be increased beyond a certain limit determined by the electric wave regulations.

The receiver according to the present invention overcomes the above mentioned disadvantage inherent to the conventional receiver.

Figure 4:
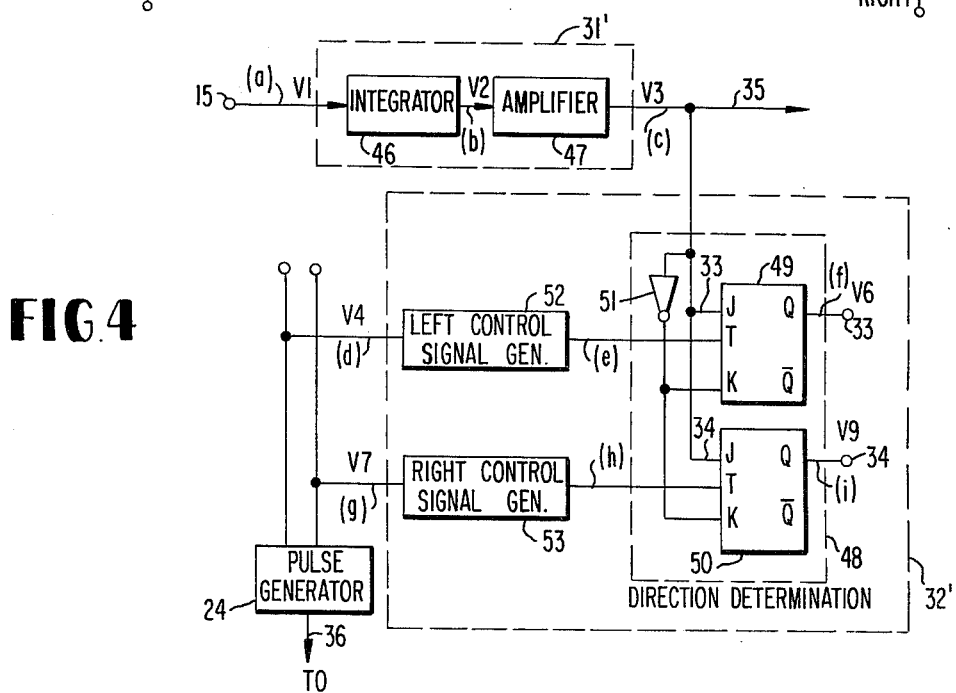
FIG. 4 is a block diagram of an improved direction sensor according to the present invention.

FIG. 4 shows a block diagram of a direction sensor according to the present invention and FIGS. 5a to 5i show waveforms of signals existing in various points in the sensor in FIG. 4. In FIG. 4, a series connection of an integrating circuit 46 and an amplifier 47 is provided in place of the low frequency amplifier 31 in FIG. 2 and a combination of J - K flip-flop circuit 48 and a pair of control signal generators 52 and 53 which generate control signals for discriminating right and left side directions respectively is provided in place of the discriminator 32 in FIG. 2.

The J - K flip-flop circuit 48 includes a pair of J - K flip-flops 49 and 50 and an inverter 51. J inputs of the J - K flip-flops 49 and 50 are connected to a common terminal to which the output of the amplifier 47 and an input of the inverter 51 are connected and K inputs of the flip-flops are connected commonly to an output of the inverter 51. To T inputs of the flip-flops 49 and 50, the outputs of the control signal generators 52 and 53 are connected respectively.

The control signal generators 52 and 53 are supplied with the output of the pulse generator 24. The output of the pulse generator 24 is also connected through a line 18 to the balanced modulator 23 as in the conventional manner. The output of the pulse generator 24 is also used to control the generation of ultrasonic energy in the anti-collision circuit 14 through a line 36.

Figure 5:
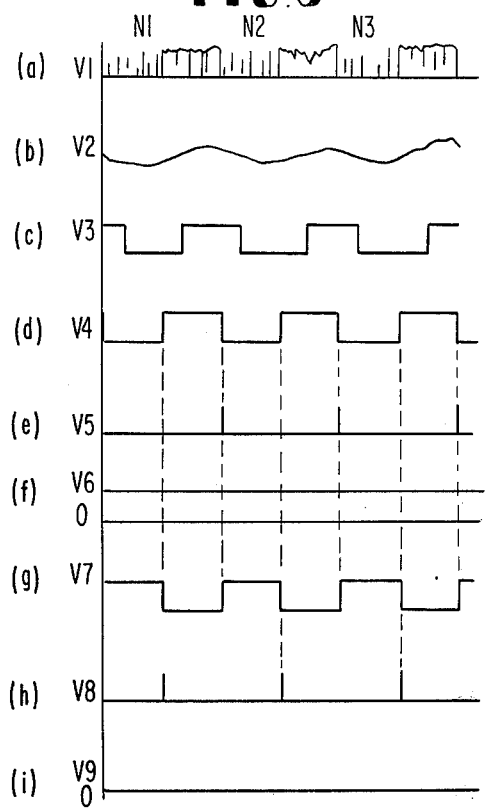
FIG. 5 is a graph showing waveforms at various points of the direction sensor shown in FIG. 3.

In operation of the present direction sensor shown in FIG. 4, when a voltage V1 as shown by an waveform a in FIG. 5 is applied to the input terminal 15 of the integrating circuit 46, i.e., the output terminal of the detection circuit 30, the voltage signal is integrated by the integrating circuit 46, resulting in a voltage V2 having waveform b at an output of the integrating circuit 46. The voltage V2 is then amplified and shaped by the amplifier 47, resulting in a pulse voltage signal V3 as shown by a waveform c in FIG. 5.

The voltage signal V3 is applied to the J inputs of the flip-flops 49 and 50 and to the input of the inverter 51 which, in turn, supplies an inverted signal V3 to the K inputs of the flip-flops 49 and 50.

The output pulse V4 and the inverted output pulse V7, both from the pulse generator 24 and shown by waveforms d and g respectively, are supplied to the control signal generators 52 and 53 respectively and the output voltages V5 and V8 having waveforms e and h, respectively, are supplied to the T terminals of the J - K flip-flops 49 and 50, respectively.

With the signals in FIG. 5, the J - K flip-flops 49 and 50 provide voltage outputs V6 and V9 having waveforms f and i respectively at their Q output terminals 33 and 34 respectively. The vehicle drive mechanism 16 is driven by the output voltage at either the terminal 33 or 34, in this case, by the voltage V6, so that the steering motor is controlled in left or right direction.

During this operation of the present system, since the width of noises N1, N2 and N3 which would be included in the output voltage V1 of the detection circuit 30 are very narrow, these noises are removed by the integrating circuit 46. Therefore, the output voltage V3 of the amplifier 47 has a well shaped pulse waveform or high S/N ratio.

The signal passed through the integrating circuit 46 is subjected to a phase delay of about 90°. In order to prevent malfunction of the present system due to this phase delay from occurring, the pulse width of the clock pulse applied to the T terminals of the J - K flip-flops 49 and 50 are made very narrow and are positioned at substantially the center point of the pulse voltage V3. In other words, the direction sensing is performed at every substantial center points of the shaped pulse voltage V3.

Therefore, according to the present direction sensor 12, the effect of irregularity of the pulse width and its phase due to relatively low S/N ratio of the detector output such as shown by the waveform a in FIG. 5 can be negligible, resulting in stable direction sensing. In addition, since the direction sensing is performed every period of the pulse voltage V3, the response is rapid.

Figure 6:
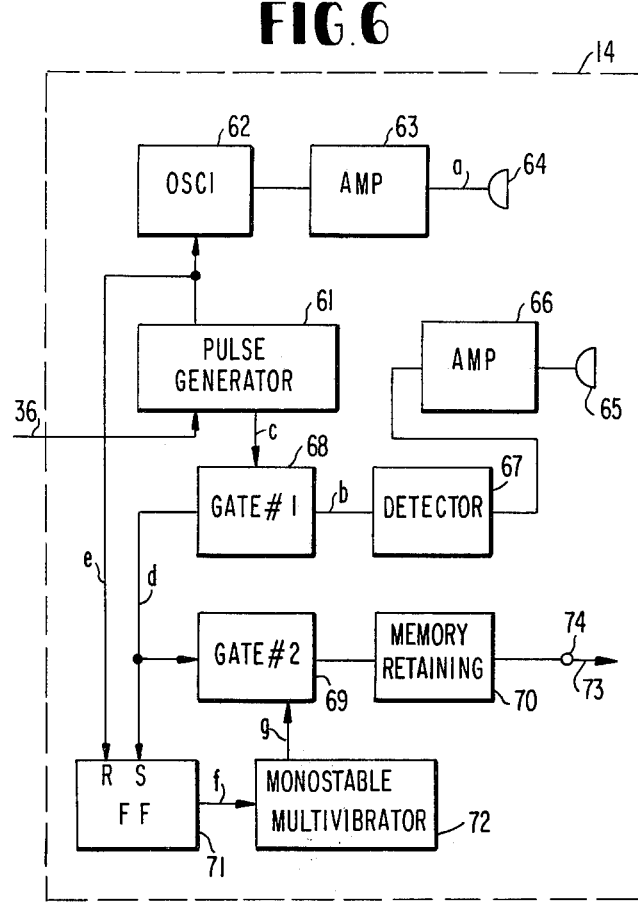
FIG. 6 is a block diagram of an anti-collision circuit according to the present invention.
Figure 7:
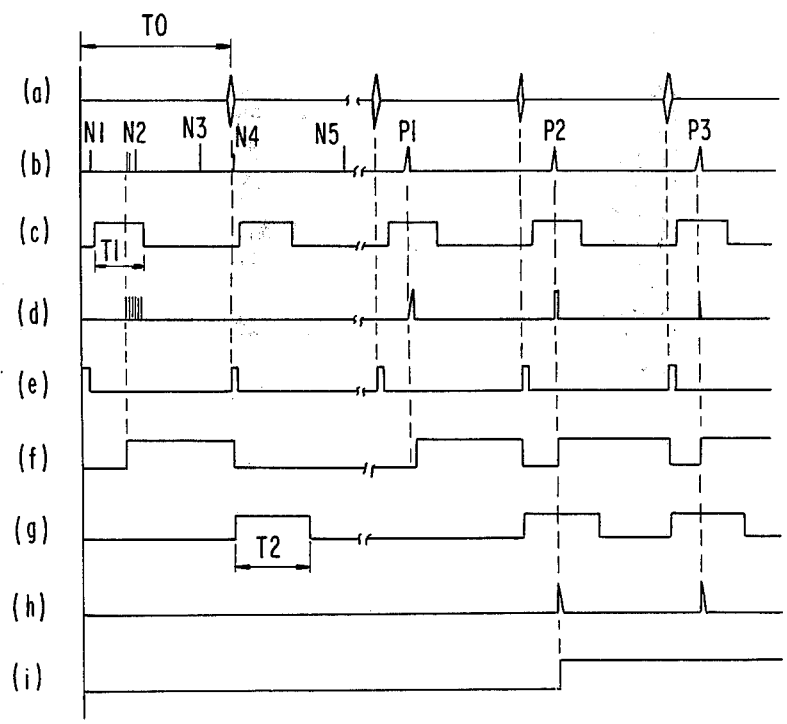
FIG. 7 is a graph showing waveforms at various points in the anti-collision circuit shown in FIG. 6.

Furthermore, since the S/N ratio is not significantly degraded even when the amplification of the amplifier 47 is set quite high, the sensitivity of the direction sensing can be much improved. For example, according to experiment, an improvement on practical sensitivity of about 10 db was obtained. Next, an ultrasonic anti-collision circuit 14 will be described, with reference to FIGS. 6 and 7. FIG. 6 shows, in block form, an embodiment of the present anti-collision circuit and FIG. 7 shows signal waveforms at various points in the circuit in FIG. 6.

In FIG. 6, a pulse generator 61 which is, in this case, a frequency divider dividing the output pulse frequency from the pulse generator 24 by a suitable number is connected to an oscillator 62, a first gate circuit 68 and a flip-flop circuit 71. An output of the oscillator 62 is connected to an amplifier 63 whose output is connected to an ultrasonic wave sending vibrator 64. The reference numeral 65 is a vibrator for receiving ultrasonic echo and the output of the receiving vibrator 65 is connected to an input of an amplifier 66 whose input is connected to a detector 67. The output of the detector 67 is connected to another input of the first gate circuit 68.

The output of the first gate circuit 68 is connected to another input of the flip-flop 71 and an input of a second gate circuit 69.

The output of the flip-flop 71 is connected to an input of a monostable multivibrator 72 the output of which is connected to another input of the second gate circuit 69. The output of the second gate circuit 69 is connected to an input of a memory retaining circuit 70 the output of which is connected to the drive mechanism 16 through a line 73.

In operation of the circuit shown in FIG. 6, an ultrasonic signal is produced by the sending vibrator 64 by amplifying the output signal of the oscillator 62 by the amplifier 63 and applying it to the vibrator 64. The ultrasonic echo is received by the receiving vibrator 65 and converted thereby into an electric signal which is amplified by the amplifier 66, detected by the detector 67 and applied to the second input of the first gate circuit 68. At the same time, the output signal of the pulse generator 61 which is a frequency divider in this embodiment is applied to the first input of the gate circuit 68 to gate the received signal. The output of the gate circuit 68 is applied to the first input of the second gate circuit 69 and the set input of the flip-flop circuit 71 to set the latter. The reset pulse for the flip-flop 71 is supplied from the pulse generator 61. The output of the flip-flop 71 is applied to the input of the monostable multivibrator 72 the output signal from which is applied to the second input of the second gate circuit 69. The output of the second gate 69 is supplied to the memory-retaining circuit 70 the output of which is supplied to an electric driving motor of the drive mechanism 16.

Describing the above mentioned operation of the anti-collision circuit 14 in FIG. 6 with reference to various waveforms shown in FIG. 7, a pulse signal voltage having period T0 as shown by an waveform $a$ is applied to the ultra-sonic transmitting vibrator 64. The pulse signal voltage $a$ is converted to ultra-sonic energy and transmitted from the vibrator 64. The transmitted ultra-sonic energy impinging upon any obstacle, is reflected thereby, and is received by the ultra-sonic receiving vibrator 65 as echo which provides an electric signal as shown by an waveform $b$ in FIG. 7. It is assumed, in this time, that, in the detected output signal there are included noises N1 to N5 (as well as the signal pulses P1, P2 and P3) which may be due to mechanical vibrations of the vehicle such as mechanical shocks etc. The above detection output signal is supplied to the first gate circuit 68. Those of the noises and the signals falling within the gate period T1 of the first gate circuit 68, i.e., the noise N2 and the signals P1, P2 and P3, are passed through the gate circuit 68 and appear at the output terminal of the gate circuit 68 as shown by an waveform $d$ in FIG. 7. The pulses shown by the waveform $d$ set the flip-flop 71 and the pulses shown by an waveform $e$ reset the flip-flop, resulting in the output of the latter shown by an waveform $f$ in FIG. 7.

The waveform $e$ is applied to the monostable multivibrator 72 providing an waveform $g$ as ito output signal. The same signal is applied to the second gate circuit 69 as a gate signal having a gate period T2. Since the waveform $d$ is applied to the second gate circuit 69 at this time as the signal input and the noise N2 terminates prior to the standing point of the gate input, the noise N2 can not pass the second gate circuit 69. As is clear from the waveform $b$ in FIG. 7, the gate signal of the second gate circuit 69 which is supplied with the output of the monostable multivibrator 72 prevents the output signal from the first gate circuit 68 from passing through the second gate circuit 69 even when one pulse can pass the gate 68, unless there is another pulse in the subsequent cycle. That is, when there are pulses received in succession, those on and after the second pulse can pass the second gate circuit 69 and, therefore, non-periodical signal pulses can not pass the latter.

In FIG. 7, the relationship between width of the respective pulses are set as $T2 > T1$.

As a result, the voltage $g$ becomes a gate signal for the second gate circuit 69 to pass the output signal $d$ of the first gate circuit 68 during the period T2, resulting in a voltage $h$. The latter voltage $h$ is supplied to the memory retaining circuit 70 the output of which is obtained at the terminal 74 as the output voltage $i$.

The memory retaining circuit 70 is adapted to retain the signal obtained from the echo for about 0.5 to 0.8 seconds and provides a D.C. voltage corresponding to the signal. The purpose of this circuit 70 is to compensate for a variation of the level of the above signal due to the varying physical relationship between the moving cart and the obstacle.

The left half of FIG. 7 illustrates the case where a non-periodical pulse is received and the right half illustrates the case where an ordinary pulse signal is received. In the latter case, the velocity of the vehicle is assumed to be, for example, 4.5 Km/hour.

In this case, when the interval T0 is assumed as 40 msec, the vehicle will move for T0 by only 5 cm. This distance corresponds to about 300 $\mu$sec of the moving time of the echo. That is, when the vehicle whose velocity is 4.5 Km/hour approaches an obstacle which is assumed as a stationary one and a train of pulses having a constant interval are passed through the first gate circuit, there exists another train of pulses having the same constant interval shifted with respect to the first pulse train by 300 $\mu$sec and, therefore, the receiving pulses occur with a constant interval.

As described hereinbefore, according to the present invention, the drive mechanism is not to be activated by any noises produced by unintended shocks and/or vibrations of the vehicle and the drive mechanism can reliably be activated by only the signal component from the receiving vibrator in response to the echo signal transmitted by the sending vibrator and reflected by the obstacle, resulting in a extremely effective anti-collision device for a self-driving carrying vehicle.

As described hereinbefore, according to the present invention, self-driving carrying vehicle is provided, which is provided with a direction sensor for determining the direction in which the vehicle is to be driven and an ultra-sonic anti-collision circuit for preventing the vehicle from colliding with any obstacle lying on the way of the vehicle. The direction sensor is characterized by having an integrating circuit to remove noise components and, together with a pair of flip-flop circuits, provides a precise direction control even under a relatively weak and uneven field strength. The anti-collision circuit of the present invention is characterized in that a gate means is provided for blocking any non-periodical signal pulses from the drive mechanism.

The scope of present invention is not limited by only the embodiments shown in the drawings but defined by the attached claims.

While the invention has been described in detail and with reference to specific embodiments thereof, it will be apparent to one skilled in the art that various changes and modifications can be made therein without departing from the spirit and scope thereof.

What is claimed is:

1. A radio-controlled vehicle having a radio frequency receiver for receiving a radio frequency signal transmitted from a transmitter positioned remote from the receiver to control an electric steering motor and a drive motor carried on the vehicle, characterized in that said receiver comprises: a non-directional and a directional antenna, a mixer for mixing signals received by said non-directional antenna and said directional antenna, respectively, said antennae being carried on said vehicle, a detection circuit having an output terminal connected to an output of said mixer, an integrator circuit having an input terminal connected to an output of said detection circuit, at least a pair of flip-flop circuits having input terminals coupled to an output of said integrator circuit, whereby a direction control signal from said integrator circuit is applied to said flip-flop circuits, and means for supplying an output signal of said flip-flop circuits to said steering motor to control the same.

2. A remote-controlled vehicle having a receiver for receiving a remote-control signal from a transmitter, and characterized by: a sending ultra-sonic vibrator mounted on said vehicle, means for supplying said vibrator with a gated oscillator signal, an oscillator gated by pulse signals having a constant period, and a pulse generator for generating said pulse signals; a receiving ultra-sonic vibrator mounted on said vehicle for receiving echo ultra-sonic energy which is transmitted by the sending ultra-sonic vibrator and reflected by an obstacle; a detection circuit which detects both the echo output of said receiving ultra-sonic vibrator and also a noise component due to shocks exerted on said receiving ultra-sonic vibrator to produce a detected signal; gate means, responsive to the detected signal, for discriminating between the pulse signal and noise components to produce an output signal; and a memory-retaining means actuated by the output signal of said gate means.

3. A vehicle as set forth in claim 2, wherein said gate means comprises: a first gate having a signal input connected to the output of said detection circuit, a gate input connected to the output of said pulse generator, and an output; a flip-flop circuit having a set input connected to said output of said first gate, and an output; a monostable multivibrator having an input connected to said output of said flip-flop, and an output; and a second gate having a signal input connected to said output of said first gate, a gate input connected to the output of said monostable multivibrator; and an output connected to said memory retaining means.

* * * * *